United States Patent [19]

Knoss et al.

[11] Patent Number: 5,755,201
[45] Date of Patent: May 26, 1998

[54] METHOD AND ARRANGEMENT FOR CONTROLLING THE POWER OF AN INTERNAL COMBUSTION ENGINE

[75] Inventors: Martin Knoss, Kyungki-Do, Rep. of Korea; Diethard Löhr, Kirchheim, Germany; Martin Streib, Vaihingen, Germany; Berthold Steinmann, Asperg, Germany; Jürgen Förster, Chemnitz, Germany

[73] Assignee: Robert Bosch GmbH, Stuttgart, Germany

[21] Appl. No.: 628,075

[22] Filed: Apr. 8, 1996

[30] Foreign Application Priority Data

Apr. 8, 1995 [DE] Germany ............ 195 13 370.6

[51] Int. Cl.$^6$ .................................................. F02D 7/00
[52] U.S. Cl. ............................................... 123/396
[58] Field of Search ................ 123/396, 362, 123/350, 399, 320, 690, 479, 440, 489; 180/197; 364/423.98, 424.34, 424.04, 431.11

[56] References Cited

U.S. PATENT DOCUMENTS

| | | | |
|---|---|---|---|
| 5,092,420 | 3/1992 | Sugawara et al. ............ | 180/197 |
| 5,150,698 | 9/1992 | Kohler et al. ............... | 123/690 |
| 5,233,958 | 8/1993 | Knoss et al. ............... | 123/396 |
| 5,235,950 | 8/1993 | Schmitt et al. .............. | 123/396 |
| 5,297,521 | 3/1994 | Sasaki et al. ............... | 123/396 |
| 5,429,090 | 7/1995 | Kotchi et al. ............... | 123/396 |
| 5,435,284 | 7/1995 | Shimizu et al. .............. | 123/396 |
| 5,447,133 | 9/1995 | Kamio et al. ............... | 123/396 |
| 5,595,159 | 1/1997 | Huber et al. ............... | 123/362 |
| 5,601,063 | 2/1997 | Ohashi et al. ............... | 123/396 |

FOREIGN PATENT DOCUMENTS 3631200  3/1988  Germany ............... 123/396

*Primary Examiner*—Raymond A. Nelli
*Attorney, Agent, or Firm*—Walter Ottesen

[57] ABSTRACT

The invention is directed to a method and an arrangement for controlling the power of an internal combustion engine. In the method and arrangement, the power-adjusting element for adjusting the supply of air to the engine is adjusted in the context of a load control loop. When the load detection becomes disabled, measures are taken for ensuring operational reliability and an emergency method for adjusting the throttle flap is described in the fault situation.

10 Claims, 6 Drawing Sheets

1

METHOD AND ARRANGEMENT FOR CONTROLLING THE POWER OF AN INTERNAL COMBUSTION ENGINE

BACKGROUND OF THE INVENTION

U.S. Pat. No. 5,092,420 discloses an arrangement for controlling the position of a throttle flap wherein the throttle flap of an engine is controlled in dependence upon an input value (desired value) in the context of an air quantity control loop. Unwanted operating conditions can develop when fault conditions for such an air quantity control loop occur. This is so because the throttle flap is not adjusted in correspondence to the desired value. Measures for ensuring the operational reliability and/or measures for improving the availability of the control system in the case of a fault are not suggested in this known arrangement.

German patent publication 3,631,200 discloses a position control loop for the position of a throttle flap to control the power of an engine. A switchover to a load control loop for adjusting the throttle flap occurs when the position control loop becomes disabled. Measures for ensuring operational reliability and/or the availability in the case of a fault of this load control loop are not suggested.

U.S. Pat. No. 5,150,698 discloses a method and an arrangement for the emergency adjustment of fuel. Here, an emergency injection time is pregiven in the case of the fault of the load detecting element with this fault being detected by monitoring the signal range of the load signal. The emergency injection time is modified by the adjusting variable of a lambda controller in the sense of an adjustment of a pregiven lambda desired value. The lambda controller controls the composition of the exhaust gas.

SUMMARY OF THE INVENTION

In view of the above, it is an object of the invention to provide measures for ensuring the operational reliability and/or for improving the availability of power control of an internal combustion engine with a control loop controlling the engine load (air quantity, air mass, intake manifold pressure, load signal).

The method and arrangement of the invention ensure and significantly improve the operational reliability and/or availability of an electronic power control of an internal combustion engine.

The measures of the invention are applied advantageously for power controls which control the power on the basis of a load control loop in all or in selected operating states of the engine. Load control loops which are applicable in this context include control loops for the air quantity, the air mass, the intake manifold pressure or the quotient of these variables and the engine rpm. Within such a control loop, a positioning element (preferably a throttle flap) which influences the power of the engine is adjusted without a positioning control.

Only with the advantageous measures of the method and arrangement of the invention is it possible to carry out an adjustment of the engine power exclusively on the basis of a load control loop. In this way, considerable complexity and therefore costs are saved.

It is especially advantageous that the method and arrangement of the invention permit distinguishing whether a fault condition is present in the signal path of the load detection or in the signal path of the throttle flap position detection.

It is also advantageous that the emergency method in the case of a fault in the detection of load achieves a considerably improved availability of the power control system.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
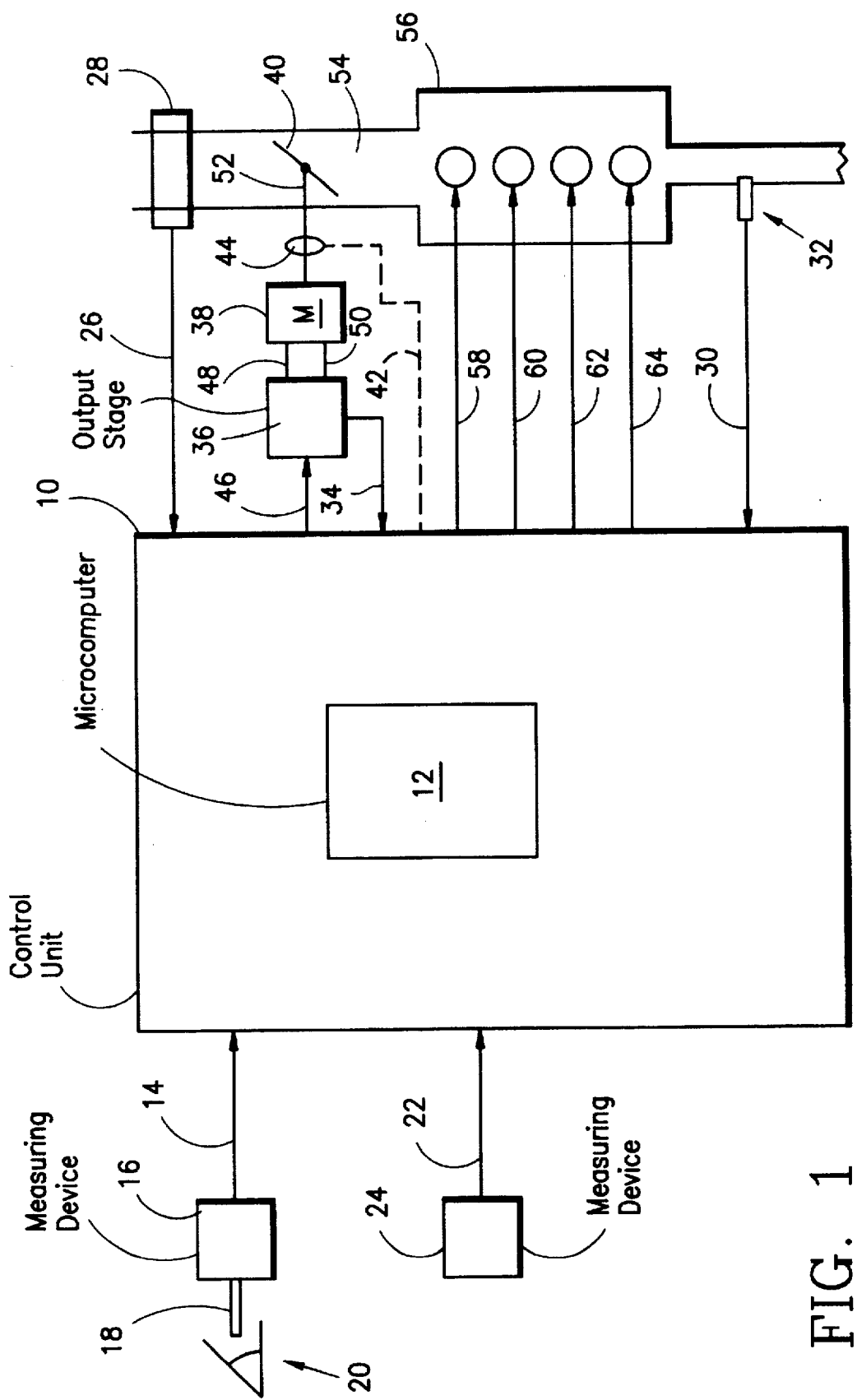
FIG. 1 is an overview block diagram of a power control system.

FIG. 1 shows an overview block circuit diagram of a control system for the power of an internal combustion engine. Reference numeral 10 identifies a control unit which includes at least one microcomputer 12. The following input lines are connected to the control unit 10 therefore to the microcomputer 12: an input line 14 from a measuring device 16; an input line 22 from a measuring device 24 for detecting the rpm of the engine; an input line 26 from a detection unit 28 for detecting the load of the engine (preferably an air-mass sensor); an input line 30 from at least one exhaust-gas probe 32; an input line 34 connected to an output stage circuit 36; and, an input line 42 from a measuring device 44 to detect the position of the power adjusting element 40 in a preferred embodiment of the invention. The measuring device 16 is connected via a mechanical connection 18 to an operator-controlled element 20 which is preferably an accelerator pedal actuated by the driver. The measuring device 16 detects the position of the accelerator pedal. The detecting unit 28 for detecting the load of the engine is preferably an air-flow sensor. The input line 34 conducts a measure for the mean current flowing through a motor 38 for actuating the power adjusting element 40.

The control unit 10 and the microcomputer 12 further include at least one output line 46 which leads to the output stage 36. The output stage is connected via lines 48 and 50 to the electric motor 38. The motor, in turn, is connected via a mechanical connection 52 to the power-adjusting element which is a throttle flap 40 mounted in the air intake system 54 of the engine 56. The control unit 10, that is, the microcomputer 12 controls the fuel quantity which is to be injected into the cylinders of the engine, and the ignition time point, if required. This control is via output lines 58, 60, 62 and 64.

For the sake of clarity, only the elements are shown in FIG. 1 which are necessary to understand the method and arrangement of the invention. In a preferred embodiment, the electric motor is a direct-current motor. In another embodiment, the electric motor can be a so-called rotation positioner or a step motor. Various components are available to enable the person of skill in this art to detect load. On the one hand, the air mass can be detected via a hot-film air mass sensor, a hot-wire air mass sensor, et cetera. The air quantity is detected either via an air-quantity sensor or via the position of the throttle flap 40. Furthermore, an intake manifold pressure sensor can be provided to detect load and can be mounted between the throttle flap 40 and the engine 56. In the preferred embodiment, the output stage circuit 46 is an H-bridge circuit for controlling the current through the electric motor 38.

During normal operation, the microcomputer 12 determines a desired value for the control loop to adjust the throttle flap 40. This desired value is determined from the position signal for the accelerator pedal 20 which is supplied to the microcomputer. This takes place on the basis of a pregiven characteristic line or a pregiven characteristic field and, if required, considers further operating variables such as engine rpm, gear transmission ratio, et cetera. The desired value formed in this manner for the load control loop is compared in a controller to the actual value detected by the measuring device 28. From the difference, a drive signal is formed for the output stage 36. The controller operates then in accordance with a pregiven control strategy, for example, as a PID controller. The drive signal is outputted via the line 46 and preferably defines a pulse-width modulated signal having a pulse-duty factor which is a measure for the mean current flowing through the electric motor 38. The current is caused to flow through the motor for both directions of movement based on the signal or on a second drive line.

A measuring resistor is built into the output stage and, according to a preferred embodiment, the mean current flowing through the motor is detected and supplied to the microcomputer 12 via the line 34. In another advantageous embodiment, and in lieu of the current, a variable related to this current such as pulse-duty factor, controller output factor, et cetera is used. The power adjusting element is, as a rule, resiliently biased into its closed position via a return spring. For this reason, a continuous current flow through the electric motor 38 is necessary to provide a steady-state adjustment of the power-adjusting element 40 outside of its rest position. In still another preferred embodiment, a position transducer is provided for the position of the power-adjusting element and the measurement signal thereof is supplied to the microcomputer 12 via the line 42. The determination of the fuel quantity to be metered to each cylinder takes place in the context of an injection time computation individually for each cylinder in still another preferred embodiment. In this connection, the base injection time is determined from pregiven characteristic fields on the basis of engine rpm and engine load and is corrected by the output signal of a lambda controller in the sense of maintaining a pregiven exhaust-gas composition. The injection time computed in this manner is outputted for the particular cylinder via the corresponding output line (58 to 64). The lambda controller operates as known to the person of skill in this art. An output signal is generated in the sense of a control to lambda 1 on the basis of the output signal of the exhaust-gas probe 32 via a pregiven control strategy.

A fault condition in the area of load detection can lead to an adjustment of the throttle flap and therefore to an adjustment of the power of the engine independently of the driver command. For this reason, and for a power control system of this kind, it is necessary to detect a disabling or a defective performance of the load detecting element especially in view of the adjustment of the throttle flap and, if necessary, to provide measures for an emergency operation to increase the availability.

This is ensured by the procedure provided by the invention shown in FIGS. 2 to 6.

Figure 2:
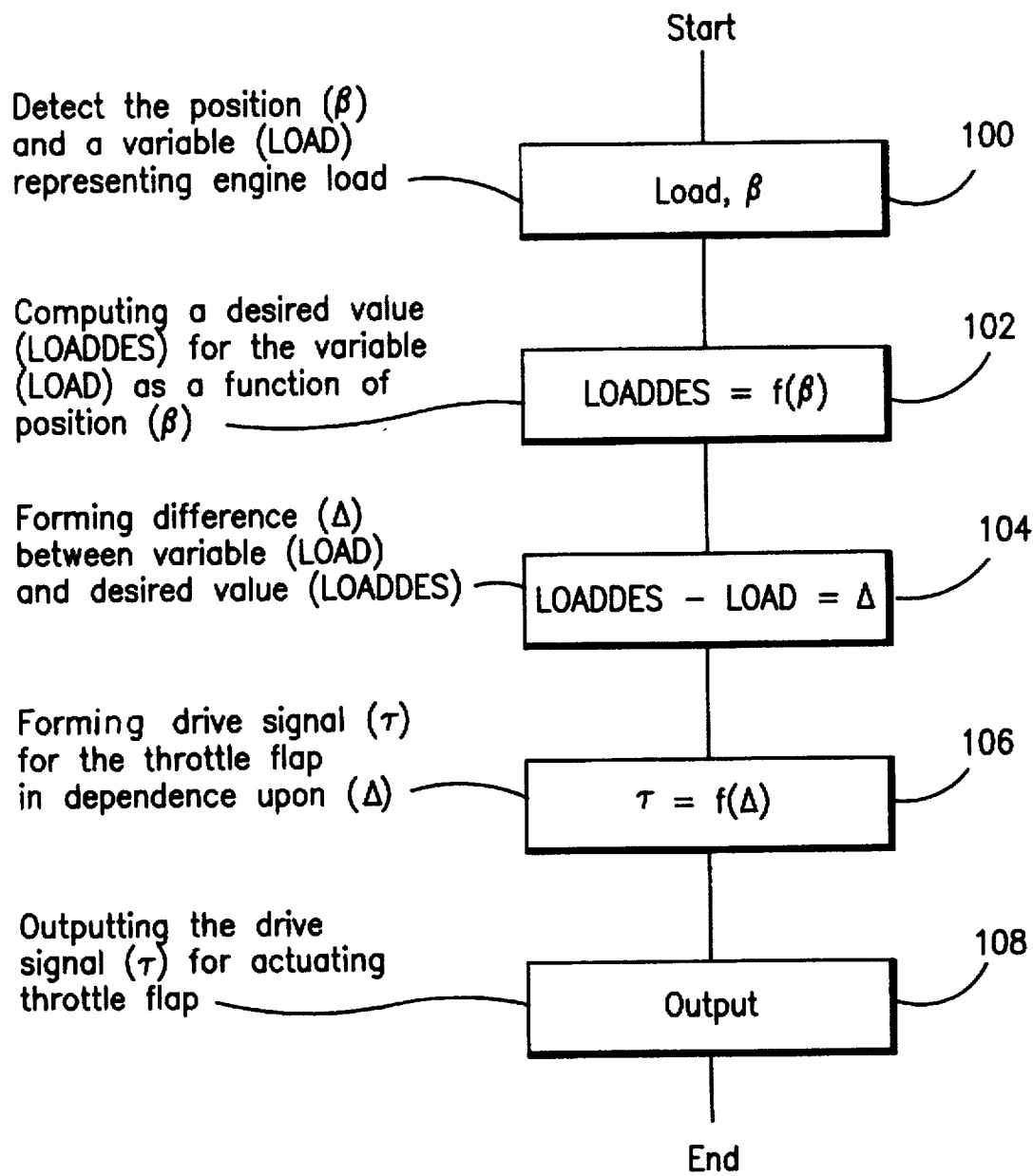
FIG. 2 is a flowchart showing the adjustment of the throttle flap.

The normal operation described above for the adjustment of the throttle flap 40 is shown in FIG. 2. After the start of the subprogram at pregiven time points, the load measured value LOAD and the accelerator pedal position β are detected in the first step 100. Thereafter, in step 102, the load desired value LOADDES is selected on the basis of a pregiven characteristic line or on the basis of a pregiven characteristic field from the accelerator pedal position value β. In step 104, the difference Δ between the load-desired value and the load-actual value (LOADDES - LOAD) is formed and the pulse-duty factor τ of the drive signal is computed in step 106 in accordance with a pregiven control strategy on the basis of the difference Δ. Thereupon, in step 108, a pulse signal having the computed pulse-duty factor is outputted to the output stage circuit 36. The subprogram is then ended and repeated at a pregiven time.

Figure 3:
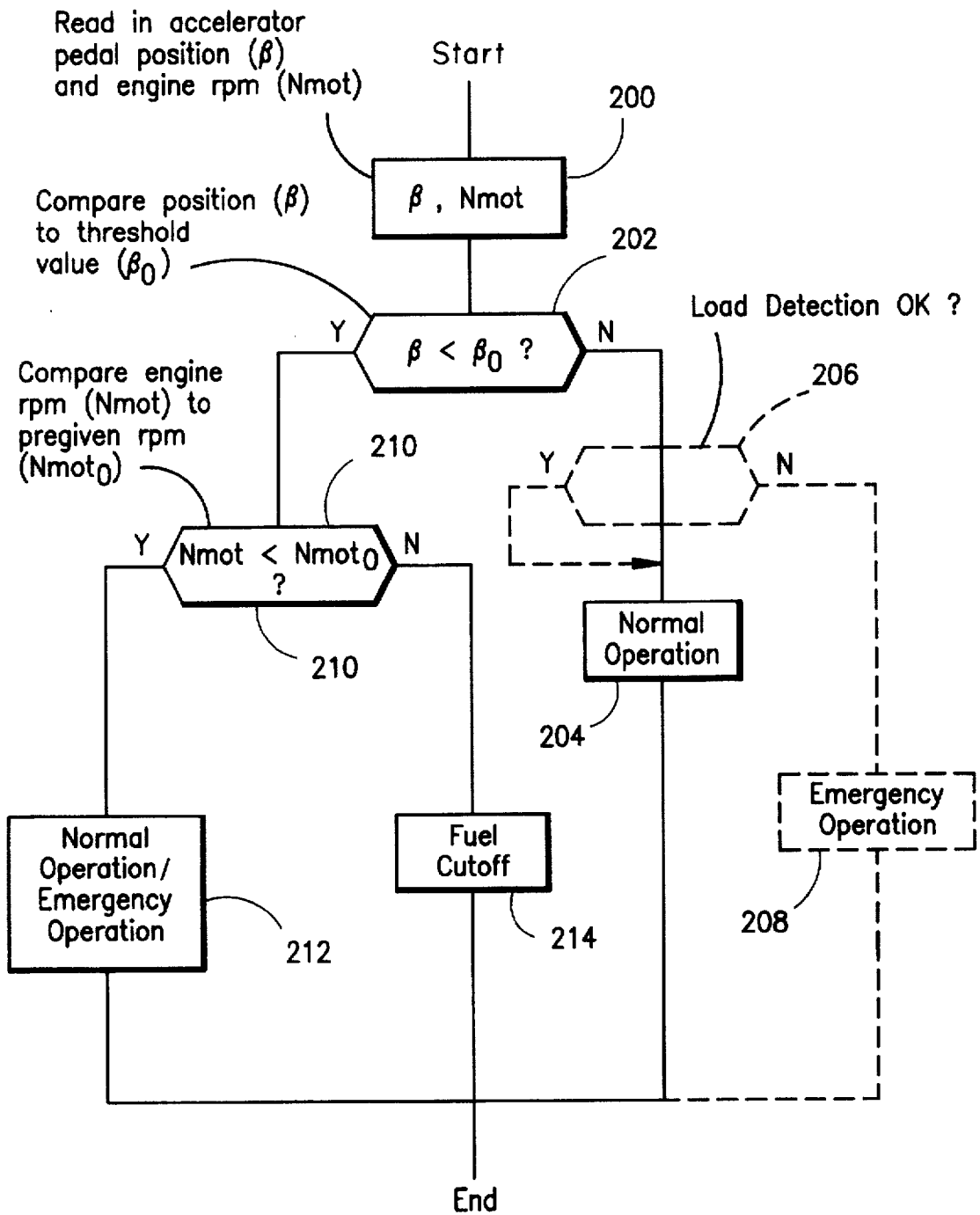
FIG. 3 is a flowchart showing an embodiment of the method of the invention wherein fuel metered to the engine is interrupted to limit the power thereof when the rest position of the accelerator pedal is detected while engine rpm exceeds a pregiven threshold at the same time.

A first embodiment of the method of the invention is shown in FIG. 3. In this embodiment, the metering of fuel to the engine is entirely or partially interrupted to limit the power thereof when the driver gives the idle command or, more specifically, when the rest position of the accelerator pedal is detected while the engine rpm exceeds a pregiven threshold at the same time.

After the subprogram shown in FIG. 3 is started at pregiven time points, the accelerator pedal position β and the engine rpm Nmot are read in in a first step 200. Thereafter, in an inquiry step 202, the accelerator pedal position is compared to a pregiven threshold value $β_0$ which limits the range of the released accelerator pedal. If step 202 yields that the accelerator pedal position value is greater then this value, then, according to step 204, normal operation of the equipment is assumed and the power control is carried out as shown in FIG. 2.

In a preferred embodiment, a check is made in inquiry step 206 as to whether the subsequently described procedure for checking the load sensor has shown that load detection is operational. The inquiry step 206 is inserted between the steps 202 and 204. If this is the case, then according to step 204, the normal operation is carried out and in the opposite case, an emergency operation to adjust the throttle flap in dependence upon driver command is initiated in accordance with step 208 as described below. If the result in step 202 is that the accelerator pedal is in its rest position or in the proximity thereof, then an idle input is present from the driver and, in inquiry step 210, the engine rpm Nmot is compared to a pregiven rpm $Nmot_0$. If the engine speed drops below this rpm, then in a manner similar to steps 204, 206 and 208, the normal operation or emergency operation is carried out (step 212). If the engine rpm exceeds the pregiven threshold, then and according to step 214, fuel metering to the engine is completely or partially switched off in the sense of limiting rpm. The engine rpm threshold value then corresponds to a value above the permissible idle rpm. In one embodiment, an engine speed of 1500 rpm has been shown to be suitable. After steps 204, 208, 212 or 214, the subprogram is ended and repeated at a pregiven time.

Figure 4:
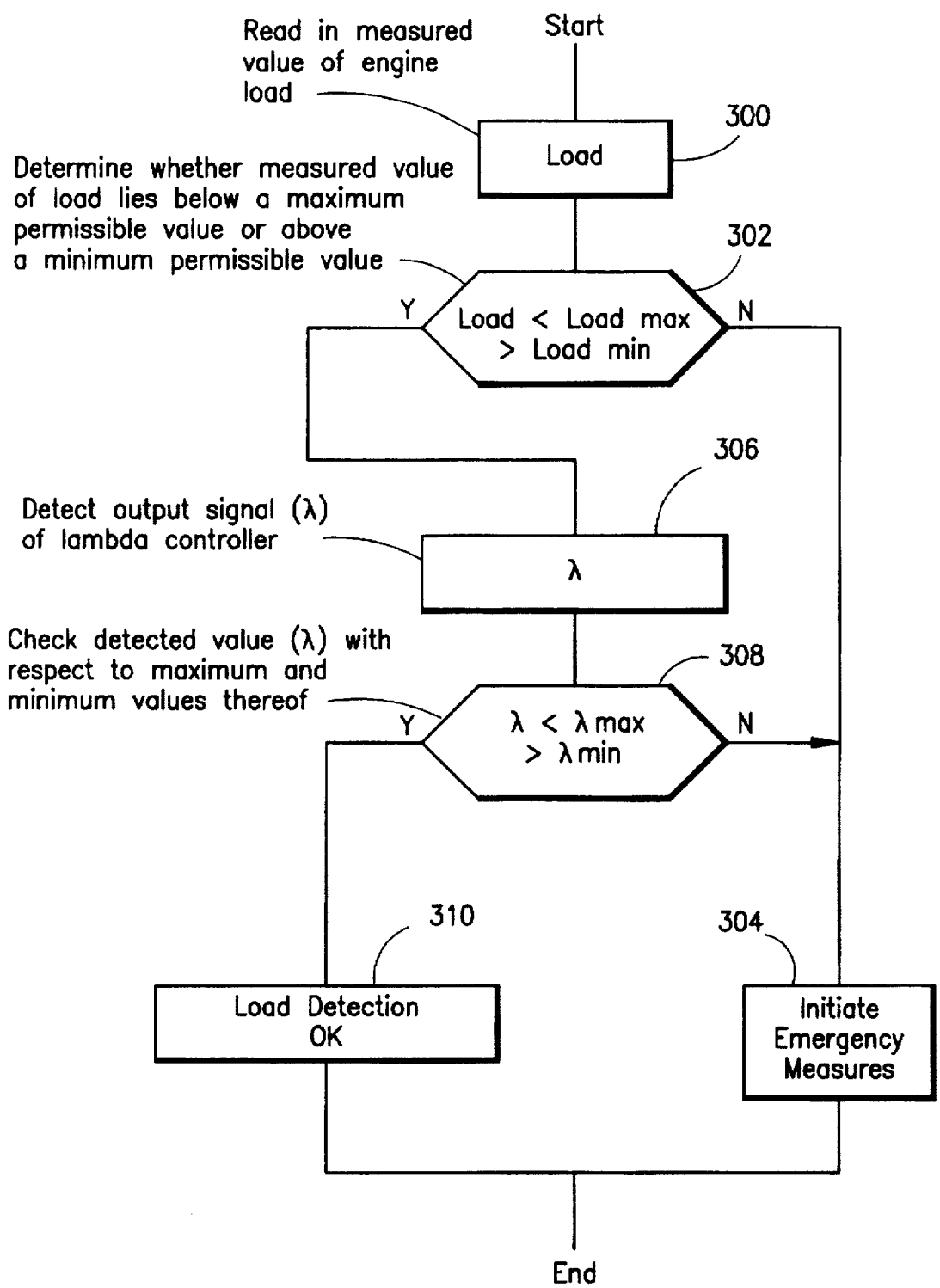
FIG. 4 is a flowchart showing an embodiment of the invention wherein the measured value of load is compared to the signal of the exhaust-gas sensor or to the controller position signal.

In FIG. 4, a preferred procedure for checking load detection is shown wherein the load measured value is compared to the signal of the exhaust-gas sensor or to the controller position signal. Here, a fault condition is detected when impermissible departures occur.

After the start of the subprogram shown in FIG. 4, a load measured value is read in in the first step 300 and a check is made in inquiry step 302 as to whether this measured value lies below a maximum permissible value or above a minimum permissible value. If this is not the case, then the load signal measured value exceeds a permissible signal range so that emergency measures are initiated in accordance with step 304. If the load measured value lies within the permissible range, then the possibility is nonetheless present that a defective load measured value is detected. For this purpose, the output signal of the lambda controller is detected in step 306 and, in the next step 308, a check is made as to the detected load value with respect to permissible maximum values and permissible minimum values. If the load detection is defective, the throttle flap is actuated via the load control loop independently of the driver input. This change of the supplied air at simultaneously constant or almost constant fuel injection, leads to a change of the exhaust-gas composition. This is detected by the exhaust-gas sensor 32. The lambda controller then attempts to control out the occurring deviation.

The positioning signal of the lambda controller leaves its permissible range as a consequence of the defective load signal. This is detected by inquiry step 308 so that emergency measures must be initiated in accordance with step 304 when the permissible maximum value is exceeded or when there is a drop below the permissible minimum value. In this case, it can be assumed that the load detection is defective. However, if the lambda controller is also outside of its permissible signal range, then the load detection is detected as operating correctly in accordance with step 310 and the subprogram is likewise ended after step 304.

In another embodiment of the invention and in addition to the output signal of the lambda controller, the output signal of the exhaust-gas sensor 32 can be used to check the operability of the load detection. If required, the output signal of the lambda sensor 32 is processed. Here, a sensor having a jump-like characteristic line is used. In other advantageous embodiments, other sensors having other characteristic line traces can be utilized. A fault condition of the load detection is then detected when the sensor signal impermissibly departs from the desired value to be adjusted by the controller.

The injection time signal, which is corrected by the lambda controller, can be applied in lieu of the lambda signal or the lambda controller signal in accordance with another advantageous embodiment of the invention in the context of fault detection or emergency measures according to the invention. For this purpose, an injection time is computed in addition to the measured load value while considering the corrections. The injection time, which is actually outputted, is compared to the computed injection time and a fault state is detected for impermissible deviations. This is so because, in the case of a fault as a consequence of defective adjustment of the air supply by the lambda controller, an excessive correction of the injection time must be undertaken which is detected by a comparison of the limit values characterizing normal operation.

The procedure for monitoring the operability of the load detection described above is especially advantageous for a system wherein the position of the throttle flap is determined in addition to detecting the load. Then it is possible in the case of an impermissible deviation between the positioning signal and the load signal to decide from the lambda controller signal whether a fault is present in the signal path of the load detection or in the signal path of the position detection. This procedure is shown in the flowchart of FIG. 5.

Figure 5:
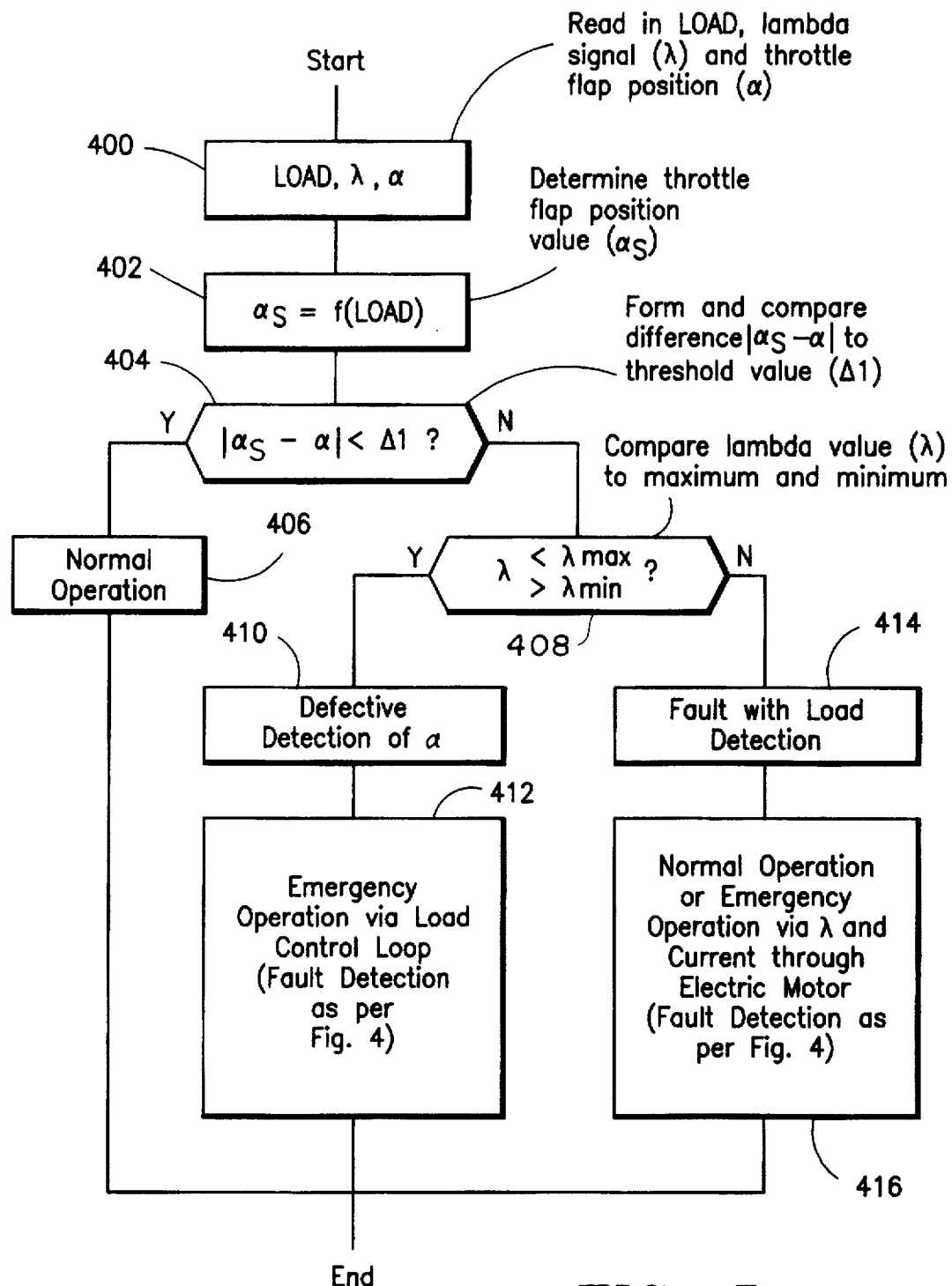
FIG. 5 is a flowchart showing an embodiment of the method to determine whether a fault is present in the signal path of the load detection or in the signal path of the position detection; and, FIG. 6 is a flowchart showing an emergency method to adjust a throttle flap when there is a defective detection of load.

After the start of the subprogram shown in FIG. 5, the load measured value LOAD, the lambda signal $\lambda$ as well as the throttle flap position $\alpha$ are read in in a first step 400. In the next step 402, a throttle flap position value $\alpha_S$ is determined on the basis of the load measured value.

In another advantageous embodiment, a load value is derived from the throttle flap position value. Thereafter, in step 404, the amount of the difference between the position value determined from the load and the measured position value is formed and compared to a pregiven threshold value $\Delta 1$. If the amount of the difference does not exceed this threshold value, this means that no fault is present. In this case, normal operation of the equipment is carried out in accordance with step 406. On the other hand, if the amount of the difference exceeds the pregiven threshold value, then a fault in the region of load detection or of the detection of position must be assumed. The lambda value is checked as to a maximum value or minimum value in the next step 408 to localize the fault condition. This takes place in a manner similar to the procedure shown in FIG. 4. If the lambda signal value does not exceed its pregiven range, then a correct load detection and a defective position detection can be assumed in accordance with step 410. According to step 412, this leads to carrying out the fault detection in accordance with FIG. 4 and (for a system having position control loop) to the emergency operation known from the state of the art via a load control loop. A fault in the area of load detection can be assumed in accordance with step 414 if the lambda signal value exceeds its pregiven signal range. In this case, emergency operation is initiated in accordance with step 416. In the preferred embodiment, this emergency operation comprises adjusting the throttle flap with the aid of the current through the electric motor and with the aid of the lambda signal as described below. In another advantageous embodiment, a switchover to a positioning control loop is made. The subprogram is ended after steps 406, 412 and 416 and repeated at a pregiven time.

Figure 6:
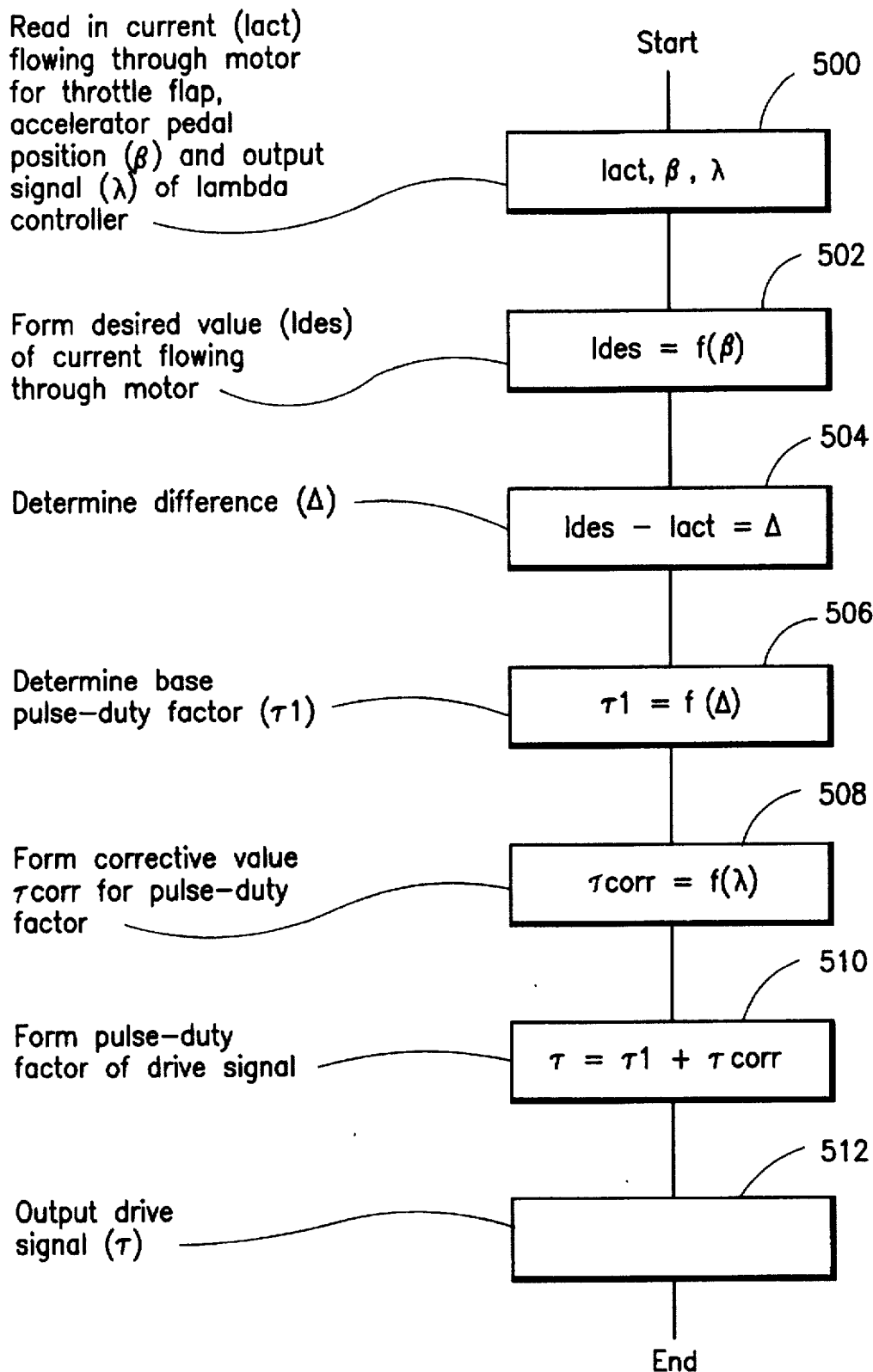

The procedure according to the invention of an emergency method to adjust a throttle flap when there is defective load detection is shown in FIG. 6.

After the start of the subprogram shown there, the following are read in at pregiven time points in a first step 500: the actual current Iact flowing through the motor (or a variable associated therewith such as pulse-duty factor, controller output signal value, et cetera), the accelerator pedal position and the output signal of the lambda controller or of the exhaust-gas sensor. In the next step 502, a current desired value Ides or a desired value for the variable associated with the current is formed on the basis of the accelerator pedal position and, if required, while considering operating variables such as engine rpm, transmission ratio, et cetera. This is done on the basis of a pregiven characteristic field or a pregiven characteristic line.

Thereafter, and in accordance with step 504, the difference between the desired current value and the actual current value is computed and, in step 506, in accordance with a pregiven control strategy such as a PID-control, a base pulse-duty factor $\tau 1$ is determined from the computed difference. Since the adjustment of the throttle flap via this emergency (current)control loop is relatively imprecise, a corrective value $\tau corr$ for the pulse-duty factor is formed in dependence upon the output signal of the lambda controller in accordance with step 508 based on the lambda signal. This corrective signal changes the pulse-duty factor for the adjustment of the throttle flap and thereby the throttle flap position in such a manner that the exhaust-gas composition assumes a pregiven value, preferably 1. This correction can be omitted if an emergency operation via the injection time takes place in accordance with the initially mentioned procedure. In step 510, the pulse-duty factor of the drive signal is formed from the sum of the base pulse-duty factor and the corrective pulse-duty factor and outputted in accordance with step 512. After step 512, the subprogram is ended and repeated at a pregiven time.

Here too, a variable representing the output signal of the exhaust-gas probe or a variable representing the injection time is applied in a similar manner in lieu of the controller output signal. This is true here as well as in other advantageous embodiments.

It is understood that the foregoing description is that of the preferred embodiments of the invention and that various changes and modifications may be made thereto without departing from the spirit and scope of the invention as defined in the appended claims.

What is claimed is:

1. A method for controlling the power of an internal combustion engine which generates exhaust gas during operation and includes a throttle flap and an operator-controlled element adjustable in position by an operator, the method comprising the steps of:

detecting the position ($\beta$) of said operator-controlled element and detecting a first variable (LOAD) having an actual value representing the load on said engine;

computing a desired value (LOADDES) for said first variable (LOAD) in dependence upon said position ($\beta$);

forming the difference ($\Delta$) between said actual value of said first variable (LOAD) and said desired value (LOADDES);

forming a drive signal ($\tau$) for said throttle flap of said engine in dependence upon said difference ($\Delta$) between said actual value of said first variable (LOAD) and said desired value (LOADDES);

outputting said drive signal ($\tau$) for actuating said throttle flap to cause said actual value to approach said desired value;

detecting a second variable ($\lambda$) derived from the composition of said exhaust gas;

detecting a fault when said first variable (LOAD) lies within a pregiven first value range (Loadmin, Loadmax) and said second variable ($\lambda$) lies outside a pregiven second value range ($\lambda$min, $\lambda$max); and, initiating an emergency operation when a fault is detected.

2. The method of claim 1, comprising the further step of determining said fault when said second variable ($\lambda$) at least exceeds a predetermined limit value.

3. The method of claim 1, comprising the further step of detecting the speed of said engine; and, at least partially interrupting metering of fuel to said engine when there is an input indicative of idle operation of said engine and when, at the same time, said engine speed exceeds a pregiven rpm.

4. The method of claim 1, wherein the speed of said engine is detected and the detection of said load represents a measure for one of the following parameters: air mass, the air quantity or the intake manifold pressure or the quotient of one of said parameters and said engine speed.

5. The method of claim 1, further comprising the steps of:

providing a position signal indicative of said position ($\beta$) of said operator-controlled element; and, determining and localizing a fault condition based upon said position signal, said load signal and said variable.

6. A method for controlling the power of an internal combustion engine which includes a throttle flap actuable by an electric motor and an operator-controlled element adjustable in position by an operator, the method comprising the steps of:

detecting the position ($\beta$) of said operator-controlled element and detecting a first variable (LOAD) having an actual value representing the load on said engine;

determining whether a fault is present in the area of detecting said first variable;

(a) for fault free operation in said area, (a1) computing a desired value (LOADDES) for said variable (LOAD) in dependence upon said position ($\beta$) of said operator-controlled element;

(a2) forming a drive signal ($\tau$) for said throttle flap of said engine in dependence upon the difference ($\Delta$) between said actual value of said variable (LOAD) and said desired value (LOADDES); and, (a3) outputting said drive signal ($\tau$) for actuating said throttle flap to cause said actual value to approach said desired value; and, (b) for a detected fault in said area, (b1) forming a desired value (Ides) for the current flowing through said motor in dependence upon said position ($\beta$) of said operator-controlled element;

(b2) detecting an actual value (Iact) for said current; and, (b3) forming and outputting a drive signal ($\tau$) for actuating said throttle flap in dependence upon a deviation ($\Delta$) of said actual value (Iact) from said desired value (Ides) to cause said actual value (Iact) to approach said desired value (Ides).

7. The method of claim 6, wherein said engine generates exhaust gas during the operation thereof, the method further comprising the step of correcting the adjustment of said throttle flap in emergency operation in accordance with a variable derived from the composition of said exhaust gas.

8. The method of claim 7, wherein said variable derived from the composition of the exhaust gas is one of the following: the output signal of a lambda controller, the output signal of an exhaust-gas probe or the injection time corrected by the output signal of the lambda controller.

9. An arrangement for controlling the power of an internal combustion engine which generates exhaust gas during operation and includes an electrically actuable throttle flap operatively connected to an electric motor and an operator-controlled element adjustable in position ($\beta$) by an operator, the arrangement comprising:

a control apparatus including a microcomputer;

a first measuring device for detecting and supplying a first variable to said control apparatus and said first variable being said position ($\beta$) of said operator-controlled element;

a second measuring device for detecting and supplying a second variable (LOAD) to said apparatus and said second variable representing the engine load;

a third measuring device for detecting and supplying a third variable ($\lambda$) derived from the composition of said exhaust gas;

said microcomputer functioning to:

(a) collect values as to said first and second variables;

(b) compute a desired value (LOADDES) for said second variable (LOAD) in dependence upon said position ($\beta$) of said operator-controlled element;

(c) compute the difference ($\Delta$) between said actual value of said second variable (LOAD) and said desired value (LOADDES);

(d) form a drive signal ($\tau$) for said throttle flap of said engine in dependence upon the difference ($\Delta$) between said actual value of said second variable (LOAD) and said desired value (LOADDES);

(e) output said drive signal ($\tau$) for actuating said throttle flap to cause said actual value to approach said desired value;

(f) collect said third variable ($\lambda$) derived from the composition of said exhaust gas;

(g) detect a fault when said second variable (LOAD) lies within a pregiven first value range (Loadmin, Loadmax) and said second variable ($\lambda$) lies outside a pregiven second value range ($\lambda$min, $\lambda$max); and, (h) initiate an emergency operation when a fault is detected.

10. An arrangement for controlling the power of an internal combustion engine which includes an electrically actuable throttle flap operatively connected to an electric motor and an operator-controlled element adjustable in position ($\beta$) by an operator, the arrangement comprising:

a control apparatus including a microcomputer;

a first measuring device for detecting and supplying a first variable to said control apparatus and said first variable being said position ($\beta$) of said operator-controlled element;

a second measuring device for detecting and supplying a second variable (LOAD) to said apparatus and said second variable representing the engine load;

a third measuring device for detecting and supplying a third variable (Iact) and said third variable being the electric current flowing through said electric motor;

said microcomputer functioning to:

collect values as to said first and second variables;

ascertain whether a fault is present in the area of detecting and collecting said second first variable (LOAD);

(a) for fault free operation in said area, said microcomputer further functioning to:

(a1) compute a desired value (LOADDES) for said second variable (LOAD) in dependence upon said position ($\beta$) of said operator-controlled element;

(a2) form a drive signal ($\tau$) for said throttle flap of said engine in dependence upon the difference ($\Delta$) between said actual value of said variable (LOAD) and said desired value (LOADDES); and, (a3) output said drive signal ($\tau$) for actuating said throttle flap to cause said actual value (LOAD) to approach said desired value (LOADDES); and, (b) for a detected fault in said area, said microcomputer further functioning to:

(b1) form a desired value (Ides) for said electric current flowing through said motor in dependence upon said position ($\beta$) of said operator-controlled element;

(b2) detect an actual value (Iact) of said electric current; and, (b3) form and output a drive signal ($\tau$) for actuating said throttle flap in dependence upon a deviation ($\Delta$) of said actual value (Iact) from said desired value (Ides) to cause said actual value (Iact) to approach said desired value (Ides).

* * * * *